US012779611B2

(12) United States Patent
Rieger

(10) Patent No.: US 12,779,611 B2
(45) Date of Patent: Nov. 3, 2026

(54) DEVICE SYSTEM AND METHOD FOR DETERMINING A DEPTH OF A BORE THAT IS PRODUCED WITH THE DEVICE SYSTEM

(71) Applicant: Hilti Aktiengesellschaft, Schaan (LU)

(72) Inventor: Hans-Joerg Rieger, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 935 days.

(21) Appl. No.: 18/017,742

(22) PCT Filed: Jul. 19, 2021

(86) PCT No.: PCT/EP2021/070075
§ 371 (c)(1),
(2) Date: Jan. 24, 2023

(87) PCT Pub. No.: WO2022/023095
PCT Pub. Date: Feb. 3, 2022

(65) Prior Publication Data

US 2023/0264270 A1 Aug. 24, 2023

(30) Foreign Application Priority Data

Jul. 29, 2020 (EP) .................................... 20188335

(51) Int. Cl.
*B23Q 17/00* (2006.01)
*B23B 49/00* (2006.01)
*B23Q 15/22* (2006.01)

(52) U.S. Cl.
CPC ............ *B23Q 15/225* (2013.01); *B23B 49/00* (2013.01); *B23B 2270/48* (2013.01)

(58) Field of Classification Search
None
See application file for complete search history.

(56) References Cited

U.S. PATENT DOCUMENTS 4,530,624 A * 7/1985 Cuneo ...................... B23Q 5/10 318/434
2006/0013663 A1 1/2006 Wiehler et al.
2017/0296204 A1* 10/2017 Matsuura ............... A61B 17/00

FOREIGN PATENT DOCUMENTS

DE 10 2004 033361 A1 1/2006
DE 102011003828 A1 8/2012
(Continued)

OTHER PUBLICATIONS

International Search Report of PCT/EP2021/070075 dated Sep. 9, 2021.

*Primary Examiner* — Paul B Yanchus, III
(74) *Attorney, Agent, or Firm* — Davidson Kappel LLC

(57) ABSTRACT

A device system with a device stand, a drilling device arranged displaceably on the device stand for carrying out drilling and a feed device for displacing the core drilling device along the device stand. The feed device has a manual feed device, designed for example as a handwheel or a lever, and the device system has a control device for evaluating measured values. The feed device or the manual feed device e has a sensor for determining measured values, the measured values being used for evaluation and transmitted to the control device, and a starting point and/or an end point of the drilling being detected by the control device through a sudden change in drilling parameters. In a second aspect, the invention relates to a method for determining a depth of a bore, the bore being produced with the proposed device system.

20 Claims, 3 Drawing Sheets

(56) References Cited

FOREIGN PATENT DOCUMENTS

| | | | |
|---|---|---|---|
| DE | 102016220218 | A1 | 4/2018 |
| EP | 3034213 | A1 | 6/2016 |

* cited by examiner

DEVICE SYSTEM AND METHOD FOR DETERMINING A DEPTH OF A BORE THAT IS PRODUCED WITH THE DEVICE SYSTEM

The present invention relates to a device system which comprises a device stand, a drilling device arranged displaceably on the device stand for carrying out drilling and a feed device for displacing the drilling device along the device stand.

BACKGROUND OF THE INVENTION

For example, DE 10 2004 033 361 A1 discloses a device system consisting of a device stand, a drilling device arranged displaceably on the device stand and a feed device for displacing the drilling device along the device stand. The feed device may be designed for example as a manual feed device.

Instead of a manual feed device, the device system may also be equipped with a motorized, so-called automatic feed device. Such devices are known as autofeed devices or cut assist devices. These automatic feed devices may be able to determine the depth of a bore that is produced with the device system. The information can be of interest to the operator of the drilling device and make it easier for him to work with the device system. The drilling depth can be used for example to maintain a predetermined drilling depth. The determination of the drilled depth of a borehole can also be further processed using information technology for billing purposes or used as a basis for billing for drilling services.

SUMMARY OF THE INVENTION

In the case of column-guided drilling devices, however, manual feed devices, in which the feed is produced purely mechanically by way of a handwheel, are often used. For such device systems with manual feed devices, no satisfactory solution for determining the depth of a bore that is produced with the device system is known so far in the prior art.

It is an object of the present invention to overcome the disadvantages and deficiencies of the prior art described above and to specify a device system and a method for determining a depth of a bore for column-guided drilling devices with a manual feed device, for example a handwheel.

The present invention provides a device system comprising a device stand, a drilling device arranged displaceably on the device stand for carrying out drilling and a feed device for displacing the drilling device along the device stand, the feed device comprising a manual feed device and the device system comprising a control device for evaluating measured values. The device system is characterized in that the feed device or the manual feed device comprises at least one sensor for determining measured values, the measured values being usable for evaluation and being able to be transmitted to the control device, a starting point and/or an end point of the drilling being detected by the control device through a sudden change in drilling parameters. With the proposed invention, a possibility of determining the depth of a borehole produced can be advantageously provided for column-guided drilling devices with a manual feed device.

It is preferred in the context of the invention that the manual feed device is designed as a handwheel. Alternatively, the manual feed device may be formed by a lever. The handwheel is preferably turned or the lever is turned or actuated in order to bring about an advance of the drilling device.

The device system is preferably set up to produce boreholes and to carry out drilling operations. The proposed device system can in this respect be referred to in the context of the invention as a drilling system. The device stand, the drilling device, the feed device, the manual feed device and the control device can preferably be referred to in the context of the invention as components or parts of the device system.

The device stand preferably comprises a guide rail and a guide carriage for receiving the drilling device, the drilling device being arranged on the guide rail by way of the guide carriage and being displaceable along the guide rail by means of the feed device. The feed device comprises in particular a manual feed device, which may be designed as a handwheel or as a lever.

The drilling device can be moved along the guide rail with the manual feed device. If the manual feed device is designed as a handwheel, it may comprise a number of handle parts which are pivotably arranged and which are coupled in a rotationally fixed manner to the guide carriage of the device stand. The manual feed device may preferably be mounted on the device stand. By tilting at least one handle part, the handwheel can be moved and a feed movement of the drilling device produced. For this purpose, a feed produced by the manual feed device is transmitted to the drilling device of the device system.

It is provided in the context of the invention that the feed device or the manual feed device comprises a sensor for determining measured values. The measured values may be for example acceleration values if the corresponding sensor is an acceleration sensor. The term “measured value” in the context of the invention preferably describes values or parameters that specify or describe the position of an object. Such position values may mean for example angles, in particular angles of rotation, or rotational information, for example the number of revolutions. It is preferred in the context of the invention that the at least one sensor is attached to a rotatable part or is directed at a rotatable part. This may be for example the axis of the manual feed device designed as a handwheel. This is advantageous in particular when the sensor is a gyro sensor.

In other words, the at least one sensor may be arranged on the feed device or on the handwheel or the lever of the proposed drilling system. Two or more sensors may also be provided within the device system, it being possible for example that the sensors for recording the measured values and/or the angles of rotation are in particular acceleration sensors, gyro sensors and/or magnetometers. In this exemplary embodiment of the invention, the angles of rotation may be transmitted to the control device of the proposed drilling system for evaluation, starting points and preferably also end points of the drilling being detected by the control device through a sudden change in at least one further drilling parameter. Drilling parameters are for example physical quantities or parameters that describe the progress of the drilling operation or processes taking place within the components of the proposed drilling system. Suitable drilling parameters are, in particular, electrical quantities, such as voltage, current and/or power, without being restricted thereto.

It is particularly preferred in the context of the invention that the beginning of the drilling process is detected by a sudden increase in power consumption and, at the end of the drilling, by a sudden drop in the power consumption of the motor of the drilling device. In this preferred embodiment of the invention, the power or the power consumption of the drilling device motor represents the drilling parameter that is used for determining the starting point or end point of the drilling operation. The power consumption of the motor of the core drilling device preferably increases greatly when the drill bit of the drilling device comes into contact with the substrate to be worked and the drilling operation begins.

It is preferred in the context of the invention that a depth of the bore can be determined using a transmission ratio and a number of revolutions of the manual feed device, the number of revolutions of the manual feed device being determinable on the basis of the measured values that are determined with the at least one sensor. The evaluations and calculations are preferably performed in the control device or they are carried out in the control device. In the context of the invention, the term "transmission ratio" is preferably to be understood as the number of rotations of the handwheel or the lever that are carried out in order to achieve a desired feed with the manual feed device.

If the manual feed device is designed as a handwheel, it is preferred in the context of the invention that the number of revolutions of the handwheel is used in order to contribute to the determination of the borehole depth together or in combination with the transmission ratio. This applies in an analogous manner to the actuation of the lever if the manual feed device is formed by a lever.

It is preferred in the context of the invention that the term "drilling" is used for the process of the drilling operation and the term "bore" is used for the borehole produced by the drilling. The term "starting point of the drilling" is thus preferably to be understood as the "beginning of the drilling operation", while the term "depth of the bore" describes the "depth of the borehole". This preferably means the increase in length that is produced during a drilling operation. If the drill bit of the drilling device cuts for example 20 cm into a substrate, this length of 20 cm is preferably understood as the "depth of the bore" or as the "depth of the borehole". It is preferred in the context of the invention that a sudden or abrupt change in drilling parameters is used as the starting point of the drilling. The term "starting point of the drilling" is to be understood in particular as a point in time, that is to say as the temporal starting point of the drilling operation.

The term "end point of drilling" can preferably be understood in the context of the invention as the point at which the tool of the drilling device reaches the floor to be worked or penetrates a wall to be drilled. The corresponding point in time at which the end point of the drilling is reached is preferably characterized in that the power consumed by the drilling device suddenly decreases.

It is preferred in the context of the invention that the drilling device comprises a drill bit as a tool and a motor for driving the drill bit. A starting point of the drilling may preferably be detected by the control device of the device system through a sudden increase in the power consumption of the motor. The sudden increase in the power consumption of the motor preferably represents a sudden change in a drilling parameter. It is preferred in the context of the invention that the sudden increase in the power consumption of the motor coincides with the beginning of the drilling operation, since the increase in the power consumption of the motor is caused in particular by the fact that the drill bit comes into contact with the substrate to be worked by the drilling device.

It is preferred in the context of the invention that determined and/or evaluated measurement data can be used for triggering functions of the drilling system or components of the drilling system. In other words, it is preferred in the context of the invention that at least one further function of the device system can be triggered on the basis of the depth of the bore. These further functions may be in particular that an acoustic and/or optical signal is output or that a drilling drive is switched off. For example, the proposed device system may emit an acoustic signal when a certain, for example previously entered, drilling depth is reached. If, for example, the thickness of a wall to be drilled through is known and a gentle breakthrough on the back of the wall is desired, the operator of the drilling system can be warned of the impending breakthrough with an acoustic signal before the breakthrough through the wall, so that the operator can for example reduce the feeding force manually in order to achieve a gentle breakthrough of the wall. It may also be preferred in the context of the invention that the drive of the drilling device is switched off when a certain borehole depth is reached. Furthermore, it is conceivable in the context of the present invention that the drive of the drilling device is controlled in an open-loop and/or closed-loop manner in dependence on the depth of the bore. This means for example that the device system is set up to set the drilling speed or a speed of rotation of the drill bit in dependence on the depth of the bore.

It is preferred in the context of the invention that the control device of the proposed device system is part of the drilling device or the feed device. In other words, the control device may be integrated in the drilling device and/or in the feed device. It may also be preferred in the context of the invention that the control device forms a separate device within the device system. The control device preferably comprises a processor, which is preferably set up to evaluate the recorded measured values, for example the angle of rotation and/or the recorded power or power consumption of the motor, and to process them further using information technology.

It is preferred in the context of the invention that the sensor is designed as an acceleration sensor or as a gyro sensor. The use of a Hall sensor is also conceivable. It is most particularly preferred in the context of the invention that the at least one sensor used is set up to detect the direction in which the handwheel or the lever is being turned. Furthermore, it is preferred in the context of the present invention that the sensors are set up to record the number of revolutions of the manual feed device independently of the position of the drilling device. For example, the drilling device may be operated on the floor, in the area of a ceiling of a room, in a straight or inclined position. It was surprising to those skilled in the art that the invention can provide a device system for determining the drilling depth which can in particular detect the revolutions of the manual feed device independently of the position of the drilling device.

In a preferred embodiment of the invention, a transmission from the sensor to the control device takes place in a wired or wireless manner. The motor of the drilling device is preferably designed as an electric motor.

It is preferred in the context of the invention that the drilling system comprises a display device for displaying determined and/or evaluated data. The display device may preferably be designed as a display, display screen, monitor, touch screen or screen, without being restricted thereto. It is most particularly preferred in the context of the invention that the display device is set up to display the determined depth of the borehole. This may take place for example graphically or by means of numerical values. For example, the display device may display a dashboard on which various items of information can be displayed for the operator of the drilling device.

It is preferred in the context of the invention that a drilled depth which is determined with the proposed system can be transmitted to a receiver for further processing. This may be for example a back office of a construction company, in which the data is evaluated, for example for billing purposes, and further processed using information technology.

It is preferred in the context of the invention that the display device is part of the drilling device or the feed device. This means that the display device may be arranged on the drilling device, i.e. it represents a component of the drilling device. Alternatively, the display device may be arranged on the feed device, i.e. represent a component of the feed device. It may additionally be preferred in the context of the invention that data can also be displayed by way of an external device. The external device may be for example a mobile communication device such as a smartphone or a laptop.

In a second aspect, the invention relates to a method for determining a depth of a bore, the bore being produced with a proposed device system. The proposed method is characterized by the following method steps:

a) recording at least one drilling parameter of the device system,
b) deriving a starting point and/or end point of the drilling from the drilling parameters recorded under a),
c) recording measured values by means of a sensor,
d) transmitting the measured values to a control device,
e) determining a number of revolutions of a manual feed device from the measured values recorded under c),
f) determining the depth of a bore from the number of revolutions of the manual feed device and a transmission ratio.

The definitions, technical effects and advantages described for the device system apply analogously to the proposed method. The drilling parameter of the device system may preferably be the power consumption of the motor of the drilling device. In other words, the proposed method may comprise the steps a) recording a power consumption of a motor of the drilling device and b) deriving a starting point of the drilling from the power consumption data recorded under a). It is preferred in the context of the invention that the drilling parameter or the power consumption of the motor can be recorded with a corresponding sensor system and passed on to the control device of the device system. This passing on of data may preferably take place in a wired or wireless manner. The data may be further processed in the control device using information technology, which can take place for example by analysis, filtering or the like. In particular, the recorded values for the drilling parameter or the power consumption of the motor are used to derive or determine a starting point of the drilling or a beginning of the drilling operation. This determination may preferably be carried out in or by the control device of the device system. Furthermore, in the context of the invention, measured values, such as angles of rotation and/or position values, are recorded. For this purpose, the feed device or the mobile feed device may comprise a corresponding sensor system, which may preferably comprise at least one gyro sensor or acceleration sensor or a magnetometer.

It may additionally be preferred in the context of the invention to additionally record that range which lies between the starting point and the end point of the drilling. This may be a time span and/or a spatial distance between the starting point and the end point of the drilling. This range is characterized in particular by the drilling parameters that change abruptly in opposite directions, for example by the power of the drilling device motor. For example, the starting point of the drilling may be characterized by a great increase in power and the end point of the drilling by a great decrease in power. As a result, the recording of the drilling depth is further facilitated or it can be designed to be more accurate.

A gyro sensor may preferably be arranged on a rotatable part, such as the axis of the handwheel, while a Hall sensor is preferably arranged such that a detection range of the sensor is directed to a rotatable part or from a rotatable to a stationary part. Possible arrangements of the sensor are shown in FIGS. 2 and 3.

It is preferred in the context of the invention that the at least one sensor of the (mobile) feed device is set up to record a measured value, such as an angle of rotation, of the handwheel or of components of the handwheel, it being possible to determine a number of revolutions of the handwheel from this measured value or angle of rotation.

For this purpose, the angles of rotation recorded by the sensor are passed on as measured values to the control device, this passing on of data preferably taking place in a wired or wireless manner. It is preferred in the context of the invention that the determination of a number of revolutions of the handwheel is carried out in or by the control device of the device system. According to the invention, it is then provided that the depth of the bore or the borehole is determined from the number of revolutions of the handwheel and a transmission ratio.

It is preferred in the context of the invention that the depth of the bore is displayed on a display device of the device system. For example, the depth of the borehole may be displayed on a display of the drilling device.

The drilling device may be in particular a diamond power tool, in particular a core drilling device, which is set up to produce cylindrical drill cores and to cut them out of a substrate to be worked. The tool of such a power tool with which the drill core is produced is preferably referred to in the context of the invention as a drill bit. In other words, it is preferred in the context of the invention that the drilling device comprises a drill bit as a tool. In this respect, the invention allows in particular a drilling depth measurement in the case of column-guided core drilling devices

BRIEF DESCRIPTION OF THE DRAWINGS

Further advantages of the invention will become apparent from the following description of the figures. Various exemplary embodiments of the present invention are shown in the figures. The figures, the description and the claims contain numerous features in combination. A person skilled in the art will expediently also consider the features individually and combine them to form useful further combinations.

In the figures, identical and similar components are denoted by the same reference signs. In the figures.

DETAILED DESCRIPTION

Figure 1:
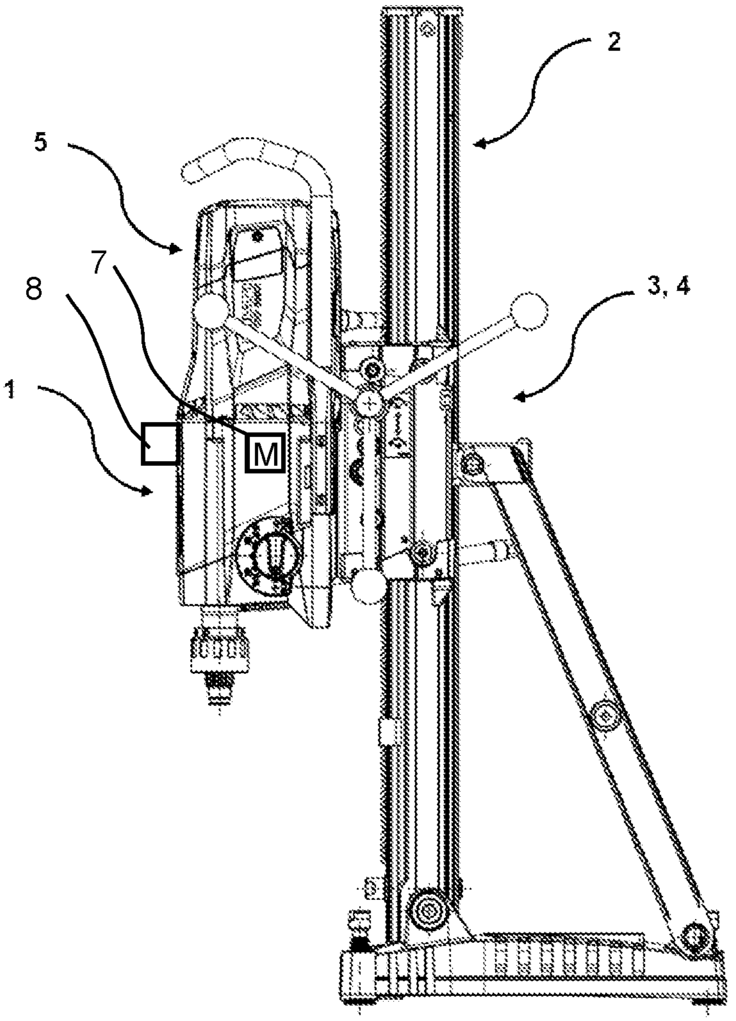
FIG. 1 shows a schematic representation of a preferred embodiment of the invention

FIG. 1 shows an exemplary embodiment of the invention. In particular, FIG. 1 shows a device system with a drilling device (1), a device stand (2) and a feed device (3). The feed device (3) comprises a manual feed device (4), which may be designed as a handwheel or as a lever. In the embodiment of the invention depicted in FIG. 1, a manual feed device (4) designed as a handwheel is shown. The drilling device (1) may be attached to the drilling stand (2), the feed device (3, 4) being arranged between the drilling device (1) and the device stand (2). The bottom left of the drawing shows the drill bit (without a reference number), with which for example a drill core can be cut from a substrate, a wall or a ceiling. FIG. 1 also shows a possible arrangement of the control device (5) on the drilling device (1). The control device (5) may preferably be part of the drilling device (1) or the feed device (3). A motor (7) and display (8) are shown solely schematically.

Figure 2:
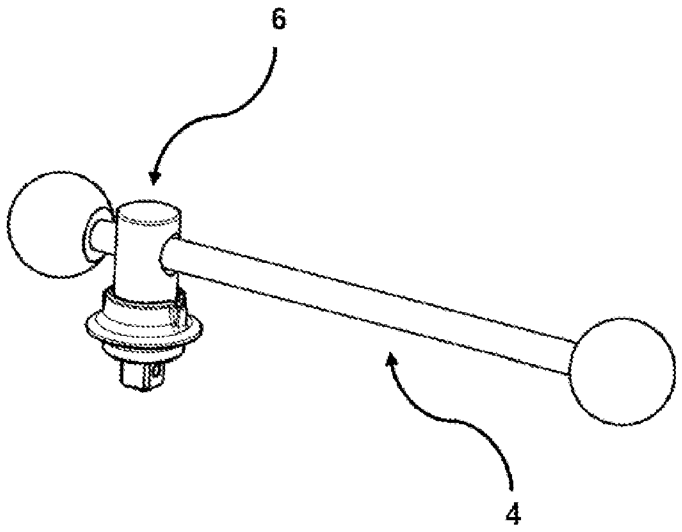
FIG. 2 shows a manual feed device designed as a lever
Figure 3:
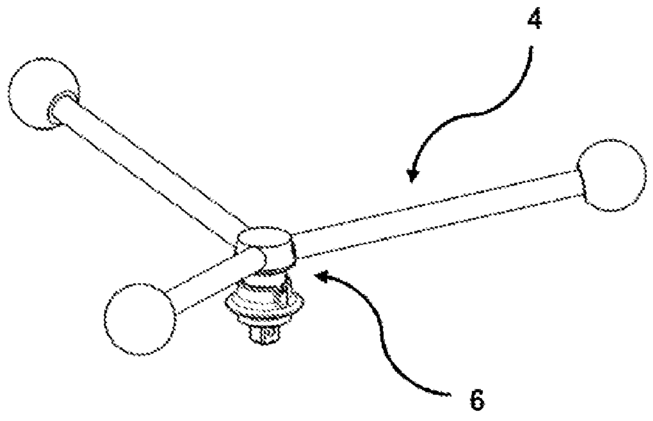
FIG. 3 shows a manual feed device designed as a handwheel

FIG. 2 shows a preferred embodiment of the invention in which the manual feed device (4) is designed as a lever. FIG. 3 shows a preferred embodiment of the invention in which the manual feed device (4) is designed as a handwheel. The at least one sensor (6), which is used in the context of the invention for determining measured values, such as angles of rotation, is preferably located in each case at a pivot point or in an axis of rotation of the lever or of the handwheel.

LIST OF REFERENCE SIGNS

1 Drilling device
2 Device stand
3 Feed device
4 Manual feed device
5 Control device
6 Sensor

What is claimed is:

1. A device system comprising:
a device stand;
a drill arranged displaceably on the device stand for carrying out drilling; and
a feed for displacing the drill along the device stand, the feed including a manual feed; and
a controller for evaluating measured values;
the feed including at least one sensor for determining the measured values, the measured values being values or parameters giving or describing a position of an object, the measured values being usable for evaluation for determining a drilling depth and being able to be transmitted to the controller, the controller configured to detect a starting point or an end point of the drilling through a sudden change in further drilling parameters;
wherein the further drilling parameters are electrical variables.

2. The device system as recited in claim 1 wherein a depth of a drilled bore is determined using a transmission ratio and a number of revolutions of the manual feed, the number of revolutions of the manual feed being determined on the basis of the measured values.

3. The device system as recited in claim 1 wherein determined or evaluated measurement data can be used for triggering functions of the device system.

4. The device system as recited in claim 1 wherein the manual feed is designed as a handwheel or as a lever.

5. The device system as recited in claim 1 wherein the controller is part of the drilling device or the feed.

6. The device system as recited in claim 1 wherein the sensor is designed as an acceleration sensor, gyro sensor or Hall sensor.

7. The device system as recited in claim 1 wherein a transmission of the measured values from the sensor to the controller takes place in a wired manner.

8. The device system as recited in claim 1 wherein a transmission of the measured values from the sensor to the controller takes place in a wireless manner.

9. The device system as recited in claim 1 wherein the drill has an electric motor.

10. The device system as recited in claim 1 further comprising a display for displaying determined or evaluated data.

11. The device system as recited in claim 10 wherein the display is part of the drill or the feed.

12. The device system as recited in claim 10 wherein the manual feed has the sensor.

13. A method for determining a depth of a bore, wherein the bore is produced with the device system as recited in claim 1, the method comprising the steps of:
a) recording at least one drilling parameter of the device system, the at least one drilling parameter being an electrical variable,
b) deriving the starting point or the end point of the drilling from the at least one drilling parameter recorded under a),
c) recording the measured values via the at least one sensor,
d) transmitting the measured values to the controller,
e) determining a number of revolutions of the manual feed from the measured values recorded under c),
f) determining a depth of a bore from the number of revolutions of the manual feed and a transmission ratio.

14. The method as recited in claim 13 wherein the depth of the bore is displayed on a display of the device system.

15. The method as recited in claim 13 wherein at least one other function of the device system is triggered on the basis of the depth of the bore.

16. The device system as recited in claim 1 wherein the at least one sensor is arranged on a rotatable part or senses the rotatable part of the device system.

17. The device system as recited in claim 1 wherein the electrical variables include a voltage, a current, or a power.

18. The device as recited in claim 3 wherein the functions of the device system include an acoustic signal.

19. The device system as recited in claim 1 wherein the at least one sensor is at least two sensors, each of the at least two sensors being either an acceleration sensor, a gyro sensor, or a magnetometer.

20. The device system as recited in claim 1 wherein the controller is configured to detect both the starting point and the end point of the drilling through the sudden change in the further drilling parameters.

* * * * *